US008200605B2

(12) United States Patent
Hagelin et al.

(10) Patent No.: US 8,200,605 B2
(45) Date of Patent: Jun. 12, 2012

(54) DECISION MAKING UNIT FOR AUTONOMOUS PLATFORM

(75) Inventors: Hans-Ove Hagelin, Linköping (SE); Johan Ehlin, Linköping (SE)

(73) Assignee: Saab AB, Linköping (SE)

( * ) Notice: Subject to any disclaimer, the term of this patent is extended or adjusted under 35 U.S.C. 154(b) by 794 days.

(21) Appl. No.: 12/279,785

(22) PCT Filed: Mar. 23, 2006

(86) PCT No.: PCT/EP2006/060980
§ 371 (c)(1),
(2), (4) Date: Jan. 21, 2009

(87) PCT Pub. No.: WO2007/093224
PCT Pub. Date: Aug. 23, 2007

(65) Prior Publication Data
US 2009/0313199 A1 Dec. 17, 2009

Related U.S. Application Data

(60) Provisional application No. 60/766,873, filed on Feb. 16, 2006.

(51) Int. Cl.
| | |
|---|---|
| G06F 17/00 | (2006.01) |
| G06F 7/00 | (2006.01) |
| G06F 19/00 | (2006.01) |
| G06N 5/02 | (2006.01) |
| G01C 22/00 | (2006.01) |
| G05D 1/00 | (2006.01) |
| B60G 17/018 | (2006.01) |
| B60G 23/00 | (2006.01) |
| B62C 3/00 | (2006.01) |
| B62K 25/00 | (2006.01) |

(52) U.S. Cl. ........... 706/47; 701/23; 701/27; 701/36; 701/40

(58) Field of Classification Search .......... 706/47
See application file for complete search history.

(56) References Cited

U.S. PATENT DOCUMENTS

| | | | |
|---|---|---|---|
| 6,108,706 A * | 8/2000 | Birdwell et al. | 709/229 |
| 6,122,572 A | 9/2000 | Yavnai et al. | |
| 6,456,941 B1 * | 9/2002 | Gutierrez | 701/301 |
| 6,941,194 B1 | 9/2005 | Dauner et al. | |
| 2002/0077726 A1 | 6/2002 | Thorisson | |
| 2002/0193972 A1 * | 12/2002 | Kudo et al. | 703/1 |

OTHER PUBLICATIONS

Kimon P. Valavanis et al; Control Architectures for Automous Underwater Vehicles; IEEE Control Systems Magazine, vol. 17, No. 6, Dec. 1997; pp. 48-64.
PCT/ISA/210—International Search Report—Oct. 6, 2006.

* cited by examiner

*Primary Examiner* — David R Vincent
*Assistant Examiner* — Ababacar Seck
(74) *Attorney, Agent, or Firm* — Venable LLP; Eric J. Franklin (57) ABSTRACT

A decision making unit suitable for an autonomous platform. The decision making unit includes a receiving module configured to receive at least one ability request and a preconditioning module configured to precondition the received ability request. A filter is configured to filter the preconditioned ability request. A first generator is configured to generate a set of behavior instructions associated with the filtered ability request. A priority processor is configured to priority process the filtered ability request. A second generator is configured to generate at least one control signal depending upon the priority processing of the filtered ability request, wherein the control signal includes information about the generated set of behavior instructions.

22 Claims, 6 Drawing Sheets

DECISION MAKING UNIT FOR AUTONOMOUS PLATFORM

CROSS-REFERENCE TO RELATED APPLICATIONS

This application claims priority to U.S. provisional patent application 60/766,873 filed 16 Feb. 2006 and is the national phase under 35 U.S.C. §371 of PCT/EP2006/060980 filed Mar. 23, 2006.

FIELD OF THE INVENTION

The invention relates in general to an autonomous platform. In particular the invention relates to a decision making unit and an autonomous system within a platform. More particularly, the invention relates to a decision making unit and an autonomous system for an airborne autonomous platform, such as an airplane or helicopter.

The invention also relates to a method for controlling the control systems of an autonomous platform.

Furthermore, the invention relates to software adapted to perform steps of the method for controlling the control systems of an autonomous platform when executed on a computer.

BACKGROUND OF THE INVENTION

Today there is an increased need for developing autonomous systems for platforms such as aircrafts, helicopters and other aerial vehicles.

An autonomous platform has to be provided with an autonomous system which performs the functions normally executed by a pilot, namely, a system capable of making decisions in real time for controlling the platform.

Autonomous platforms may be arranged for a variety of applications, for example surveillance missions for gathering intelligence, transport missions for transporting goods and/or passengers, or missions directed to more specific applications to be carried out by the platform, such as locating and responding to a threat.

In military aviation and civil air traffic it is of the uppermost importance that autonomous aerial platforms fulfill safety requirements and flight certifications set out by prevailing regulations. Further, it is highly desirable that aerial platforms are easily adaptable so that they can be conveniently updated as operating conditions change, such as the evolution of more rigorous safety requirements.

There is therefore a need for a robust and flexible decision making unit of an autonomous platform.

There is also a need for an architecture of a decision making unit and an autonomous system which provides improved autonomous management of the platform.

SUMMARY OF THE INVENTION

One object, according to an aspect of present invention, is to provide an autonomous platform which allows for improved resource management.

Another object, according to an aspect of the invention, is to provide a decision making unit which is easily updated according to revised safety regulations.

Another object, according to an aspect of present invention, is to provide a robust and flexible decision making unit for an autonomous platform.

Yet another object, according to an aspect of present invention, is to provide a robust and flexible autonomous system for a platform.

These objects are fulfilled by a decision making unit comprising:
means for receiving at least one ability request;
means for preconditioning the received ability request;
means for filtering the preconditioned ability request;
means for generating a set of behaviour instructions associated with the filtered ability request;
means for priority processing of the filtered ability request; and
means for generating at least one control signal depending upon the priority processing of the filtered ability request, wherein the control signal comprises information about the generated set of behaviour instructions.

Preferably the means for generating the set of behaviour instructions is arranged to generate at least one task, wherein each task is related to a set of predetermined behaviour instructions.

Preferably the set of behaviour instructions predetermined behaviour instructions comprises a combination of instructions relating to guidance, sensor use, payload and communication.

Preferably the means for filtering the preconditioned ability request is arranged as modular units, wherein each modular unit is arranged to filter an associated ability request.

Preferably the means for generating a set of behaviour instructions comprises means for receiving platform status information, wherein the set of behaviour instructions is generated depending upon said platform status information.

Preferably the means for pre-processing comprises means for receiving platform status information, wherein the set of behaviour instructions is generated depending upon said platform status information.

Preferably the number of possible generated set of behaviour instructions is finite.

Preferably the number of possible ability requests is finite.

Preferably the means for generating the set of behaviour instructions is arranged to process a plurality of filtered ability requests simultaneously.

The architecture of the decision making unit is arranged to limit the demands made for resources to the minimum required for the requested ability. Each of the requested abilities also has a set of parameters, whose values are used upon determination of which tasks and behaviours are to be executed. In this way many requested abilities can be handled simultaneously.

The general and flexible system architecture presented herein allows for management and/or control of an arbitrary control system in the platform.

Advantageously, the system is arranged so that it can easily be adjusted to incorporate additional autonomous sub-systems or to delete unnecessary or undesired autonomous sub-systems.

Advantageously, the system is arranged so that it can easily be adjusted to incorporate additional sub-systems or to delete unnecessary or undesired sub-systems of the platform.

The invention also relates to an autonomous system suitable for a platform, such as an airborne vehicle, comprising the decision making unit depicted above.

Preferably the means for generating ability requests is arranged for communication with the decision making unit, and to automatically transmit generated ability requests to the unit.

Preferably the non-requesting means is arranged for communication with the decision making unit for providing information to the decision making unit, wherein said information comprises platform status information.

The invention also relates to an autonomous platform comprising the autonomous system, comprising the autonomous system and sub-systems of the platform.

Preferably the sub-systems of the platform are arranged to generate platform status information and communicate said information to the autonomous system.

Preferably the platform is a flying vehicle, preferably a vehicle selected from the group consisting of: an aircraft, an airplane, and a helicopter.

Alternatively the autonomous platform is a watercraft or an under watercraft, preferably selected from the group consisting of: a boat, a ship, and a submarine, or a land vehicle, preferably a land vehicle selected from the group consisting of: an automobile, a train, and a cross-country vehicle.

A positive effect of the architecture of the decision making unit is that use resources of the platform concerning the sub-systems and autonomous sub-systems is optimized. This because each allowed and prioritized requested ability which is to be executed by means of a control signal only make use of the necessary behaviours. This means that sensors and different units of the platform to a higher degree are available for executing abilities requested by other autonomous sub-systems.

Advantageously the requested abilities allow facilitated controlling of the control systems of the platform because they are in fact "high level" abilities.

Advantageously there is provided a flexibility of the decision making unit which make the same easy to upkeep. This makes use of platforms incorporating the decision making unit cost effective.

The decision making unit is suitable for use in different kinds of platforms which make the unit versatile and therefore commercially attractive to produce.

Additional objects, advantages and novel features of the present invention will become apparent to those skilled in the art from the following details, as well as by practice of the invention. While the invention is described below, it should be understood that the invention is not limited to the specific details disclosed. A person skilled in the art having access to the teachings herein will recognise additional applications, modifications and embodiments in other fields, which are within the scope of the invention.

BRIEF DESCRIPTION OF THE DRAWINGS

For a more complete understanding of the present invention and further objects and advantages thereof, reference is now made to the examples shown in the accompanying drawings, in which.

DETAILED DESCRIPTION OF THE DRAWINGS

Figure 1:
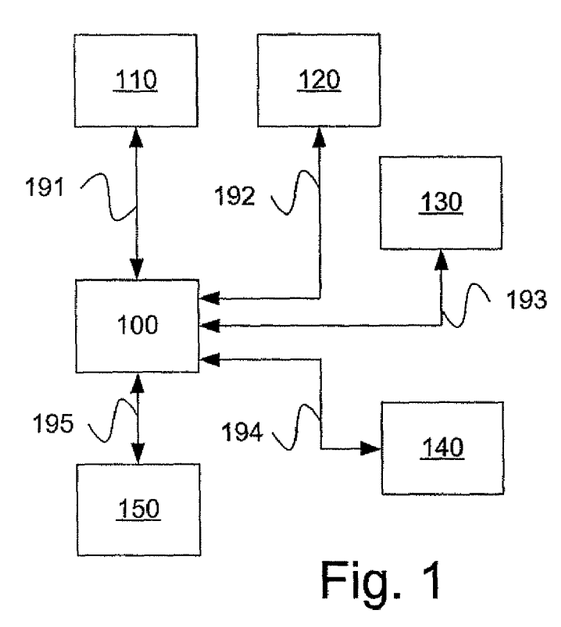
FIG. 1 schematically illustrates an overview of a platform in an example environment according to an aspect of the present invention.

With reference to FIG. 1, a platform 100 is shown. The platform is an autonomous platform, such as an unmanned aerial vehicle (UAV). The autonomous platform 100 is, according to one embodiment of the invention, an airplane, such as a passenger traffic airplane. Alternatively the airplane can be a military aircraft, such as a fighter, bomber, reconnaissance airplane, or a combination thereof. The autonomous platform 100 can also be a type of helicopter, a robot or a missile.

It should be noted that the autonomous platform 100 alternatively can be a ground vehicle, water craft or underwater craft, e.g. an automobile, ship or submarine, respectively. Alternatively, the autonomous platform 100 can be a space craft or a satellite.

Hereinafter the term "link" refers to a communication link which may be a physical connector, such as an optoelectronic communication wire, or a non-physical connector such as a wireless connection, for example a radio or microwave link.

The platform 100 is arranged for communication with another autonomous platform 110 via a link 191. The platform 110 is of the same type as the platform 100. The platforms 100 and 110 are arranged for autonomous communication with each other. The platform 100 is also arranged for communication with an aerial vehicle 120, such as an independent civil aircraft, via a link 192. The platform 100 is arranged for communication with a platform 130 via a link 193. The platform 130 may be an aerial vehicle such as a commanding aircraft or an airborne communication platform or a positioning system, such as the Global Positioning System (GPS). The platform 100 is also arranged for communication with an air control tower 140, or the like, via a link 194. The air control tower is typically situated at an airport and functions as known in the art. Furthermore, the platform 100 is arranged for communication with a ground unit 150, such as for example troops, a radar station, artillery, a guidance station or another unit or type of station.

The autonomous platform 100 is depicted in greater detail below.

Figure 2:
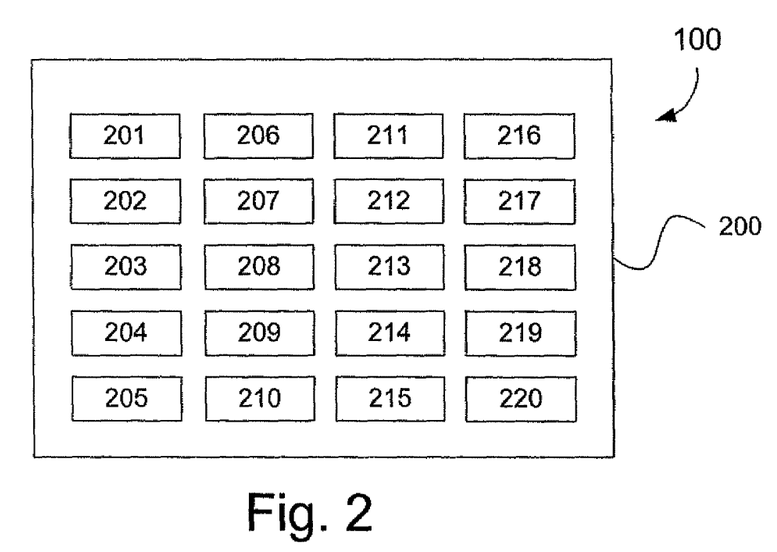
FIG. 2 schematically illustrates autonomous sub-systems of a platform according to an aspect of the present invention.

FIG. 2 schematically illustrates at set of autonomous sub-systems 200 comprising autonomous sub-systems 201-220 of the autonomous platform 100. In this example twenty autonomous sub-systems are shown. It should be noted that the platform 100 may comprise a variety of different autonomous sub-systems, greater or fewer in number than the autonomous sub-systems shown in FIG. 2.

The platform 100 comprises two mutually different types of autonomous sub-systems. A first type of autonomous sub-system consists of ability requesting sub-systems 201-213. A second type of sub-systems consists of non-requesting autonomous subsystems 214-220. The former type of autonomous sub-systems are arranged to request abilities depending upon a detected need. According to one embodiment, the autonomous sub-systems are arranged to detect a need for requesting an ability. In the following the autonomous sub-system 201, ACAS, is used for purposes of explanation. It should however be noted that any ability requesting autonomous sub-system functions according to the same principles in a corresponding way.

Depicted in FIG. 2 are examples of requesting autonomous sub-systems 201-213, namely
201 Automatic Collision Avoiding System, ACAS which is arranged for detecting a need for avoiding a collision with e.g. another airborne platform, buildings or other obstacles on the ground. A typical ability to be requested as a consequence of a detected need of risking a collision in air with another platform is then <avoid collision>.

The other autonomous sub-systems are: 202 Separation, which is arranged for separation of aerial vehicles; 203 Route planning RP, which is arranged for replanning of routes 204 Weather, which is arranged for avoidance of aviation in non-allowed weather; 205 ATC/GCS Link Monitor, which is arranged for link management and supervision thereof; 206 GCAS, which is a Ground Collision Avoidance System; 207 TaxCAS, which is arranged for avoidance of collisions during ground movements; 208 PAM, which is a Permitted Area Monitoring-system; 209 Vehicle Monitoring, which is arranged for monitoring of the platform; 210 Execution Monitoring, which is arranged for monitoring of executed commands; 211 Mission/GCS, which is arranged for mission management; 212 Service/GCS, which is arranged for service administration; and 213 ATC, which is arranged for management of civil aviation procedures.

Also depicted in FIG. 2 are examples of non-requesting autonomous sub-systems 214-220, namely: 214 NOTAM, which is arranged for management of air space limitations; 215 Onboard flight planner, which is arranged for management of route planning 216 BCL-T, which is arranged for management of traffic rules; 217 MAP, which is arranged for management of maps; 218 SIM, which is arranged for management of onboard simulators and simulations; 219 ATOL, which is arranged for automatic take off/landing; and 220, which is an autonomous sub-system of the category Other.

Figure 3:
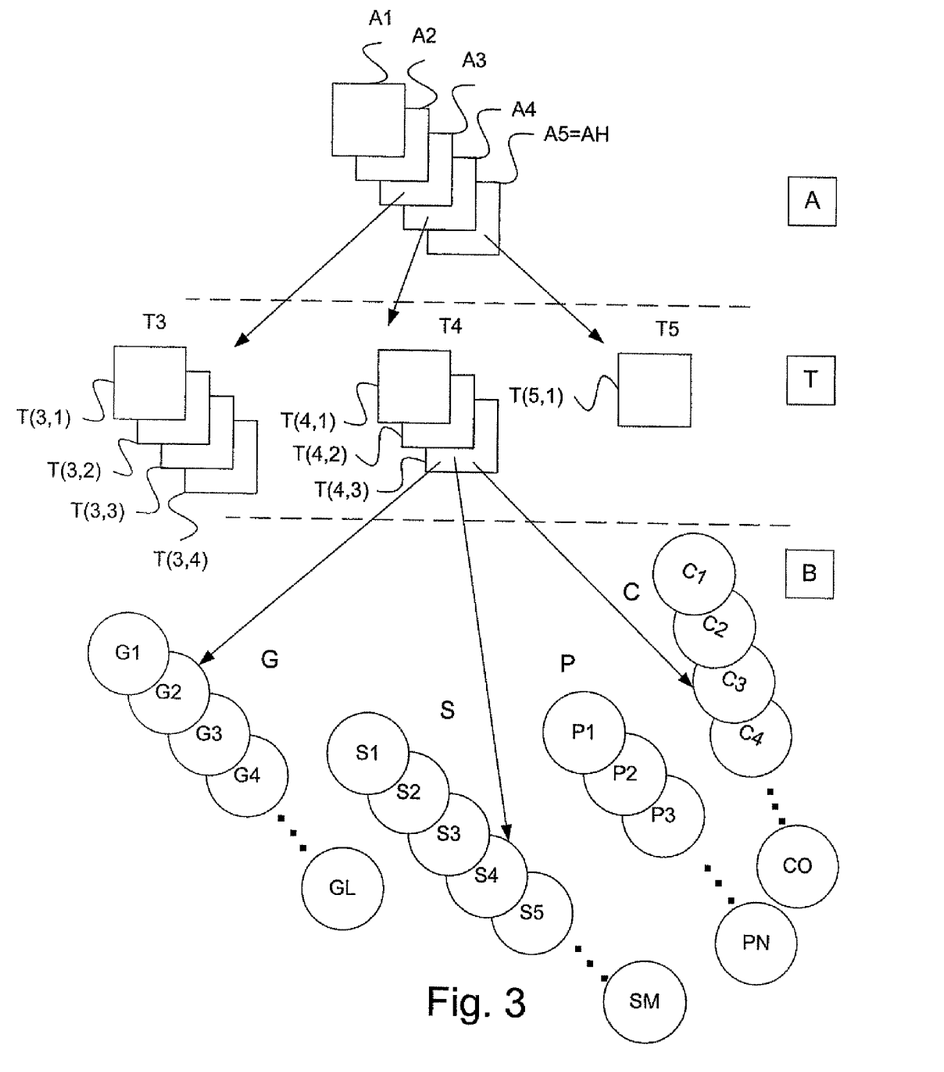
FIG. 3 schematically illustrates exemplary data structure according to an aspect of the present invention.

FIG. 3 schematically illustrates a data structure DS, which is to be processed by the decision making unit 160 according to an aspect of the invention. The data structure is a dynamic structure which can be modified so that existing abilities can be deleted, alternatively new abilities can be added to a set of abilities A1-AH that can be requested by different autonomous sub-systems 201-213 (not shown). H is a positive integer. For example, H can be 1000 or 10000. It is shown in FIG. 3 that a finite number of abilities A1-A5 are provided. Thus, in this example H=5.

Examples of abilities are <take off phase>, <landing phase>, <reconnaissance>, <search for one or more assigned objects>, <ingress area A>, which is related to approaching an area A, <waypoint routing>, <enter stand-by mode at request of ATC>, <alter course (or height) at ATC request, <avoid collision>, <execute separation at ATC request>, etc.

An arbitrary requested ability A can be divided into one or more task sets T1-TR as shown in the figure, where R is a positive integer. For example, the ability A3 is divided into a task set T3 consisting of four tasks T(3,1), T(3,2), T(3,3) and T(3,4). The ability A4 is divided into three tasks T(4,1), T(4,2) and T(4,3). The ability A5 is divided into task T(5,1). The tasks are generated depending upon platform information status information.

Moreover, each task T(R,r), where r is a positive integer, is associated with a predetermined set of behavior instructions B(X,Y), where X and Y are positive integers. Thus, the task T(3,3) is associated with an associated set of behavior instructions B(3,3). A particular set of behavior instructions B(X,Y) comprises an instruction set I(X,Y)=I(G, S, P, C), wherein the instruction set I(X,Y) comprises information associated with at least four different instruction categories, namely Guidance (G), Sensor use (S), Payload (P) and Communication (C). Each instruction category G, S, P and C is divided into a number of different predetermined behavior instructions G1-GL, S1-SM, P1-PN and C1-CO, respectively, wherein L, M, N, O are positive integers.

In the illustrated example the ability A4, which may be requested, corresponds to a set of generated tasks T4, which is consisting of the tasks T(4,1), T(4,2) and T(4,3). Each of tasks T(4,1), T(4,2) and T(4,3) is associated with a set of behavior instructions B(4,1), B(4,2) and B(4,3), respectively. In turn, each set of behavior instructions comprises a specific predetermined instruction set. For example, the set of behavior instructions B(4,3) is associated with a the specific instruction set I(G2, S4, 0, C3) meaning that the instructions G2, S4 and C3 are eventually to be integrated in a control signal B* for controlling control systems of the platform 100. In this particular case there are no instructions regarding the payload P of the platform.

According to one embodiment the behavior instructions are pre-stored sequences of software code.

According to one embodiment the association process for each generated task is performed sequentially, i.e. in the case of T4 starting with T(4,1) and thereafter associating a set of behavior instructions for T(4,2) and T(4,3), in that order.

As stated above a particular ability A4 is divided into a generated set of tasks T4. It is shown, in this particular example, that the ability A3 is divided into T(3,1), T(3,2), T(3,3) and T(4,3).

ATB (Ability Task Behavior) Example 1

| Ability A6: Take off | | |
|---|---|---|
| Associated Tasks: | T(6, 1) | Preparation Parking Position |
| | | B(6, 1) I(6, 1) = I(G16, 0, 0, C111) |
| Wherein: | | |
| G16 = Hold Breaks | | |
| S = Off | | |
| P = Off | | |
| C111 = Communication with ATC "Request taxing instructions". | | |
| | T(6, 2) | Taxiing to Holding Position |
| | T(6, 3) | Preparation Holding Position |
| | T(6, 4) | Take Off |
| | T(6, 5) | Lift Off to Level Out |

Herein, only the behavior B(6,1), corresponding to the set of behavior instructions I(6,1), which is associated with the task T(6,1) is stated. The associated tasks T(6,1)-T(6,5) are generated depending upon platform status information. Preferably the associated tasks T(6,1)-T(6,5) are generated depending upon simultaneous platform status information generated by sub-systems of the platform.

Generally, the generated set of tasks for a given requested ability A may thus differ depending on the various states a platform may have. For example, at a first time T1 the ability A4 may result in a generation of a set of tasks T4 consisting of T(4,1), T(4,2) and T(4,3) as depicted above. At a second time T2 the ability A4 may result in a generation of a set of tasks T4 consisting of T(4,1), T(4,2), T(4,3) and T(4,5) or a set of tasks T4 consisting of T(4, 1) and T(4,2), depending upon platform status, such as platform speed or altitude.

Example 2

| Ability A7: Landing | | |
|---|---|---|
| Associated Tasks: | T(7,1) | To IAF |
| | T(7,2) | GPS Approach |
| | T(7,3) | Landing |
| | T(7,4) | Post Flight |

The behaviors can be parameterized. A behavior is parameterized when the ability is forwarding parameter values.

Figure 4:
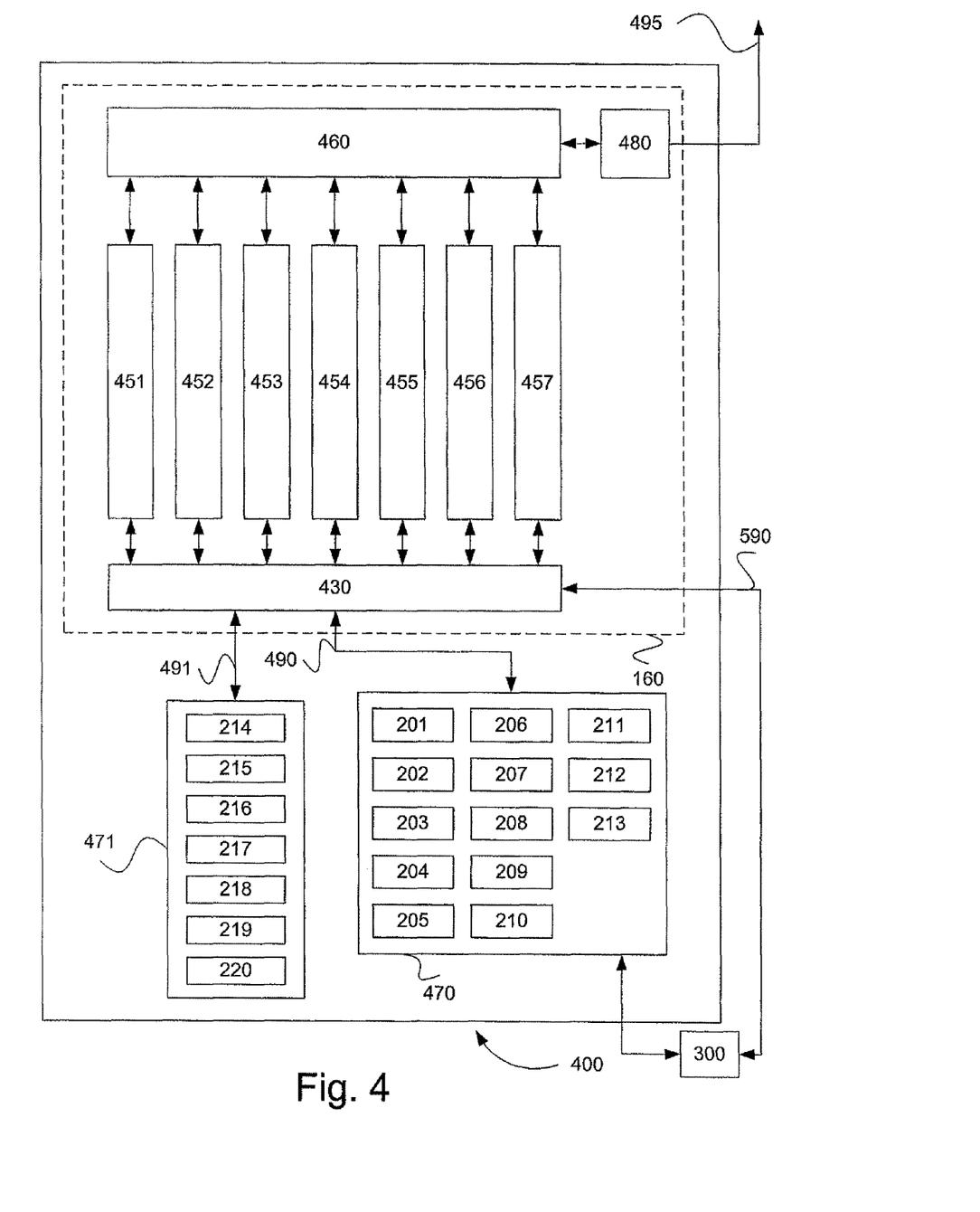
FIG. 4 schematically illustrates an autonomous system according to an aspect of the present invention.

FIG. 4 schematically illustrates in greater detail an autonomous system 400 of the platform 100, according to an embodiment of present invention. The system 400 comprises the decision making unit 160. The system 400 also comprises ability requesting means 470 for requesting abilities, which means comprises the autonomous sub-systems 201-213. The requesting means 470 for requesting abilities is arranged for communication with the decision making unit 160 via a link 490. The autonomous system 400 also comprises non-requesting means 471. The non-requesting means 471 comprises the autonomous sub-systems 214-220. The non-requesting means 471 is arranged for communication with the decision making unit 160 via a link 491.

The autonomous sub-systems 201-213 of the ability request generating means 470 for generating ability requests comprises are also referred to as actors 201-213. The actors 201-213 are also referred to as ability request generating autonomous sub-system modules 201-213. The actors 201-213 are arranged to receive input signals S1-SU, where U is a positive integer, from a set of sub-systems 300 of the platform. According to one embodiment the actors 201-213 are arranged to continuously receive input signals S1-SU from sub-systems of the platform. The input signals S1-SU comprise platform status information generated by different sub-systems which is provided as input information to allow generation of an ability request Req(K), where K is an integer associated with a particular actor K. The autonomous sub-systems 201-213 are arranged to detect a need for an ability request as discussed with reference to FIG. 3. The autonomous sub-systems 201-213 are arranged to generate requests for abilities A1-AH depending upon the received input signals S1-SU. An arbitrary autonomous sub-system 201-213 is arranged to detect a need for an ability request chosen from a predetermined dynamic group.

The non requesting means 471 may be arranged to generate and transmit information, such as platform status information, relevant for e.g. a preconditioning process which is to be depicted in greater detail below. The non requesting means 471 is arranged to generate and transmit information, such as platform status information, relevant for e.g. a task generating process which is to be depicted in greater detail below. Also the requesting means is arranged to generate and transmit information, such as platform status information, relevant for e.g. the preconditioning process or task generating process.

The decision making unit 160 comprises preconditioning means 430 for processing requests Req(K). The preconditioning means 430 is arranged to receive generated ability requests Req(201. 1-W)-Req(213. 1-W), where W is a large positive integer, in a continuously or discrete manner. For clarification purposes, the notation Req(K) is a general notation, whereas the notation Req(Z. 1-W) indicates that the ability request is generated by the actor Z and is given an identification number in the interval [1,W]. The preconditioning means 430 is arranged to parameterize all of the received requests Req(201. 1-W)-Req(213. 1-W) so as to adopt them for further processing in the decision making unit 160. For example the preconditioning means 430 may be arranged to apply internal variables to the received ability requests Req(201. 1-W)-Req(213. 1-W) in the decision making unit. The internal variables comprises information about platform status. The preconditioning means 430 is arranged to forward the preconditioned ability requests to rule packages 451-463 (not all of the described features are shown in FIG. 4).

Pre-conditioning means 430 is arranged to provide values to internal quantities of the decision making unit (160). Data, such as platform status information, provided from any of the sub-systems in the set 300, external of the autonomous system, is used for the provision of values to the quantities. This provided data is according to an embodiment of the invention triggering the value provision to the quantities. Different quantities are thus parameterized in the preconditioning means 430. According to one embodiment of the invention all internal quantities of the decision making unit are given a particular value or status, such as a numeric number or a logical state (e.g. false or true).

The herein specified quantities may be seen as a higher level quantity of variables. The quantities can be an algorithm or a mathematical function. For example, one quantity may be a control principle, comprising a variable defining a distance between the platform and another platform. A quantity can comprise one or more variables and thus be rather complex. The quantities are also referred to as premises or preconditions.

The decision making unit 160 comprises a plurality of rule packages, of which only rule packages 451-457 are shown in FIG. 4. It should however be noted that each one of the actors 201-213 is associated with one of rule packages 451-463, respectively. The term "being associated with" as used here means the relevant rule package is arranged to process the preconditioned ability request generated by an associated corresponding actor. For example, the rule package 451 is a ACAS rule package arranged to process an ability request Req(201.1-W), the rule package 452 is a Separation rule package arranged to process an ability request Req(202.1-W), etc.

The rule packages 451-463 are each arranged to perform an allowance check of a provided ability request Req(K). Thus, the decision making unit 160 is by means of the rule packages arranged to filter out non-valid ability requests. A requested ability may be filtered out for example if present platform status simply does not allow the requested ability to be executed. For example, a request relating to use of weapon may be filtered out if the platform is placed on ground.

According to one embodiment the rule packages 451-463 are replaced by a single means for filtering out non-valid ability requests. However, an advantage of the architecture presented herein for the decision making unit 160 is the modularity which is why, in the case of a single means, this dynamic function should be considered. For example, a single hardware filtering device should have software modules corresponding to the rule packages which are easy to add, delete or modify, so as to achieve a dynamic and user friendly filtering device.

According to one embodiment each actor 201-213 is associated with at least one of the rule packages 451-463. This means that according to one embodiment the filtering means may comprise a plurality of sub-filtering means comprising the functionality of two or more rule packages. For example, the rule packages 451, 452 and 453 can be provided as a separate group package means, which would serve as rule package means for received requests Req(201. 1-W), Req (202. 1-W), and Req(203. 1-W) generated by the actors 201, 202 and 203 depending upon input signals S1, S2 and S3 sent from sub-systems 301, 302 and 303, respectively. The set of sub-systems 300 comprises the sub-systems 301, 302 and 303, among other.

The ability requesting means 470, non-requesting means 471 and decision making unit 160 are, according to one embodiment of the invention, software modules comprising computer readable code for carrying out functions as described herein. Alternatively, the ability requesting means 470, non-requesting means 471 and decision making unit 160 are hardware modules arranged to perform the functionality as described herein.

Each of the filtering means 451-463 are arranged for communication with a behavior generating means 460. The behavior generating means 460 is also referred to as an ATB (Ability Task Behavior) processing device.

Valid ability requests Req(K), which also are referred to as filtered ability requests FReq(K), are communicated from the filtering means to the behavior generating means 460. The behavior generating means 460 is arranged to process the filtered ability requests FReq(K) so as to generate a set of behavior instructions B(X,Y).

Figure 5:
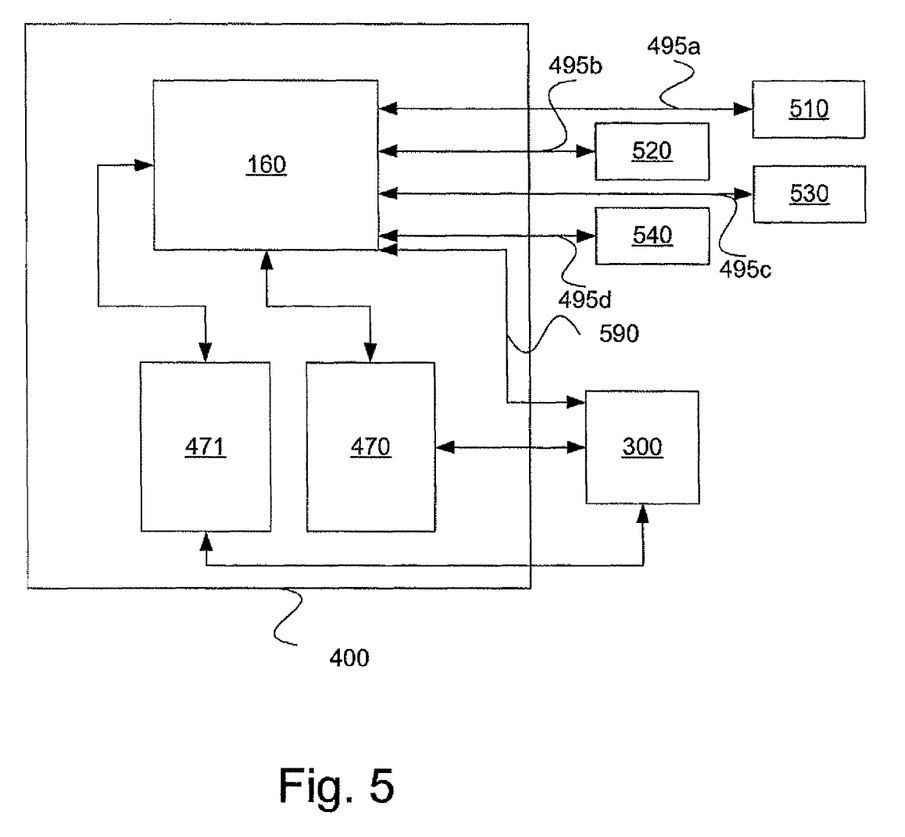
FIG. 5 schematically illustrates an autonomous system according to an aspect of the present invention.

The behavior generating means 460 is arranged to receive platform status information from the set of sub-systems of the platform via a link 590 (as illustrated in FIG. 5). For each requested filtered ability FReq(K), a set of tasks is generated in accordance with what is depicted with reference to FIG. 3. The generated tasks are generated depending upon the received platform status information. Furthermore, for each task within a set of tasks a predetermined set of behavior instructions is identified.

Alternatively, the preconditioning means 430 is arranged to receive platform status information from the set of sub-systems of the platform via the link 590.

Alternatively, the preconditioning means 430 and the behavior generating means 460 are arranged to receive platform status information from the set of sub-systems of the platform via the link 590.

Means for prioritizing 480 is arranged to prioritize which filtered ability requests FReq(K) are to be communicated as control signals to different control systems of the platform via a link 495. This prioritization process is performed on the at least one set of behavior instructions after they have been generated by the behavior generating means 460. This provides a better ability to identify free recourses within the platform and to optimize the overall performance of the autonomous platform. This prioritization process is performed in accordance with predetermined prioritization rules stored in the means for prioritization 480. One such rule can be, for example, to always prioritize an ability request relating to avoid a collision before an ability request relating to zooming of a sensor during a surveillance mission with the platform 100. Another rule of prioritization could be to give priority to an ability request relating to landing the platform due to low fuel status before an ability request relating to passing a particular waypoint.

The prioritization means 480 is further arranged to generate a control signal B* for a requested ability that has actually been prioritized, wherein the generated control signal B* comprises information about the generated behavior instructions of the set of behavior instructions. The prioritization means 480 is arranged to send the generated control signal B* to an adequate control system, for example control system 510 (not shown).

According to one embodiment the behavior generating means 460 is arranged to generate the control signal B* for a requested ability that has actually been prioritized, wherein the generated control signal B* comprises information about the generated behavior instructions of the set of behavior instructions. In this case the generated control signals are prioritized.

FIG. 5 schematically illustrates the autonomous system comprising the ability requesting means 470, non-requesting means 471 and the decision making unit 160. Further it is illustrated that the set of sub-systems 300 is arranged for communication with both the requesting means 470 and the non-requesting means 471. Furthermore, the set of sub-systems 300 is arranged for communication with the pre-conditioning means of the decision making unit so as to communicate platform status information thereto. The set of sub-systems 300 comprises a plurality of sub-systems, such as a radar system. Various sub-systems of the set of sub-systems are known in the art.

The decision making unit 160 is arranged for communication with different control systems of which four are illustrated in FIG. 5, namely a flight control system (FCS) 510, sensor control system (SCS) 520, payload control system (PCS) 530 and communication control system (CCS) 540. The decision making unit 160 is arranged to transmit a prioritized final behavior in the form of a control signal B*. The control signal B* is also referred to as S(K).

In this example the link 495 depicted with reference to FIG. 4 is replaced with four links 495*a-d*, one link for each control system 510, 520, 530 and 540.

Figures 6A, 6B:
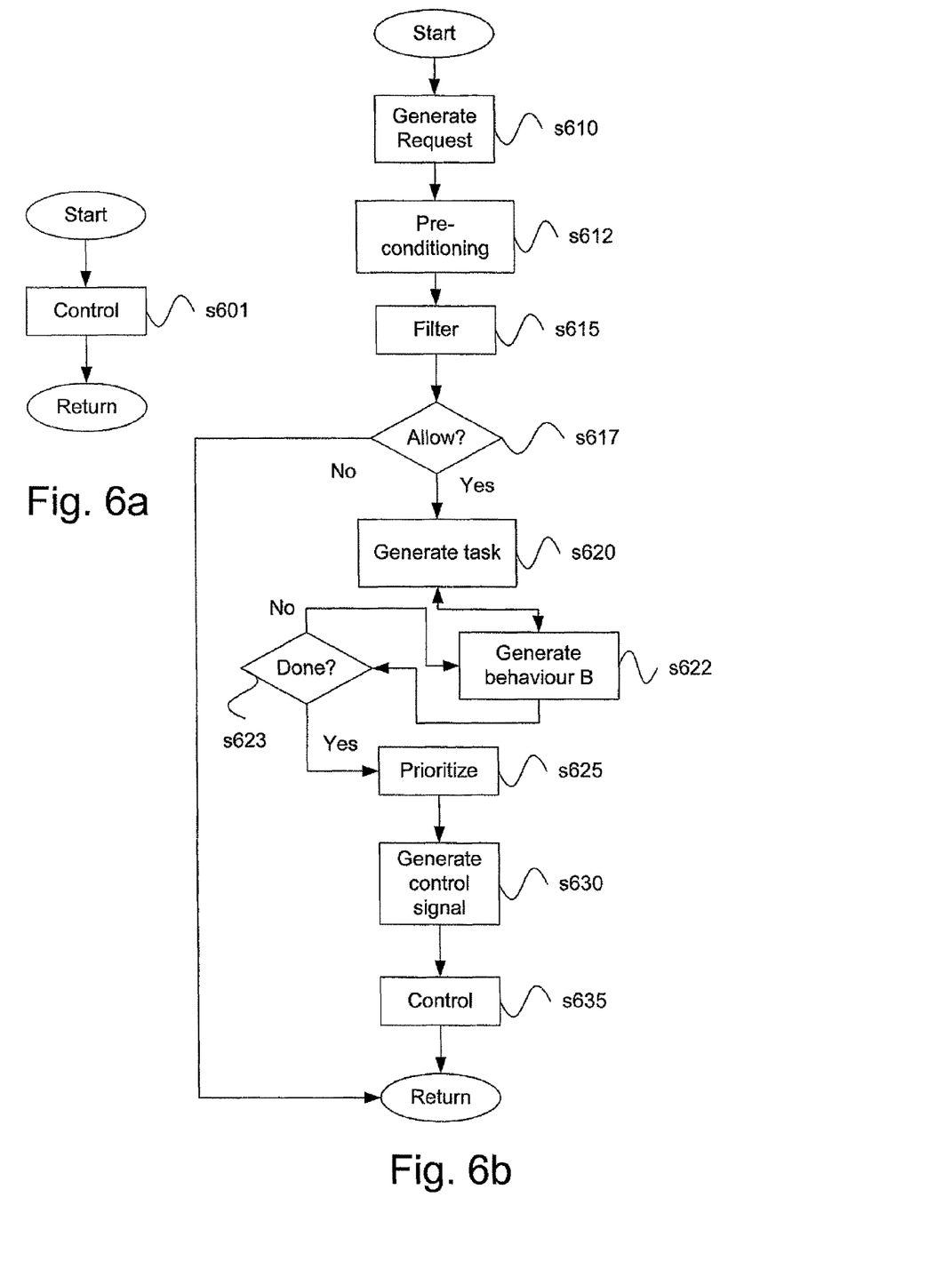
FIG. 6*a* schematically illustrates a method for controlling control systems of an autonomous platform according to an aspect of the present invention.
FIG. 6*b* schematically illustrates in greater detail a method for controlling control systems of an autonomous platform according to an aspect of the present invention.

FIG. 6*a* schematically illustrates a method for autonomous control of control systems of a platform according to an aspect of the invention. The method comprises a first method step s601. The first method step s601 comprises the steps of:
  detecting a need for requesting at least one ability;
  generating at least one ability request associated with said ability;
  performing a filtering process on said ability request;
  generating at least one task depending upon the filtered ability request;
  generating a set of behaviour instructions depending upon the generated task;
  generating at least one control signal comprising information about the generated behaviour instructions; and
  controlling at least one control system of the platform by means of said at least one control signal.
Preferably the method comprises the step of:
preconditioning the ability request associated with said ability before the step of performing a filtering process, wherein the preconditioning comprises the step of:
  providing the ability request with predetermined internal variables.
Preferably the generating at least one task step depends upon a status information data entity comprising information about platform status.
Preferably the method comprises the step of:
  performing a filtering process on said ability request, wherein the filtering process further comprises the step of:
  applying at least one rule package on the ability request so as to identify whether or not the ability request is a valid request.
Preferably the generating at least one ability request step depends upon sub-system generated input data.

Preferably the method comprises the step of prioritizing one control B* out of a plurality of generated control signals.

FIG. 6b schematically illustrates in greater detail a method for autonomous control of control systems of a platform according to an aspect of the invention. The method comprises a first method step s610. In the method step s610 an ability request Req(K) is generated by an actor K depending upon platform status information provided as input data resulting in a detected need for generating said request. After the method step s610 a subsequent method step s612 is performed.

In the method step s612 the generated ability request Req(K) is preconditioned. Pre-conditioning of the generated ability request Req(K), for example involves the step of providing values of internal quantities associated with the ability request. After the method step s612 a subsequent method step s615 is performed.

In the method step s615 the preconditioned generated ability request Req(K) is filtered by means of an applied rule package. The filtering process involves the step of controlling internal states so as to identify whether the ability request is to be filtered out or not. After the method step s615 a subsequent method step s617 is performed.

In the method step s617 an allowance determination process is performed depending upon an outcome of the filtering process according to the preceding method step s615. If the filtered ability request FReq(K) is considered allowable for further processing a subsequent method step s620 is performed. If the filtered ability request FReq(K) is not considered allowable for further processing the method ends.

In the method step s620 at least one task T of a set of tasks is generated depending upon the filtered ability request FReq(K). As described above the at least one generated task T is generated depending upon a platform status information. After the method step s620 a subsequent method step s622 is performed.

In the method step s622 a set of behaviour instructions associated with a first generated task T is generated. More specifically, each generated task T is associated with a particular predetermined set of behaviour instructions which are identified. After the method step s622 a subsequent method step s623 is performed.

In the method step s623 a check is performed to see whether all generated tasks of the set of tasks are associated with a corresponding predetermined set of behaviour instructions or not. If they are, a next method step s625 is performed. If they are not, the method step s622 is performed for a task T(K+1).

In the method step s625 a prioritization process is performed. It should be noted that the method schematically described herein and in particular with reference to FIGS. 6a and 6b concerns a process wherein several ability requests are required and a prioritization procedure is necessary to provide an adequate behaviour instructions implementation sequence. In this method step such a process is performed. After the method step s625 a subsequent method step s630 is performed.

In the method step s630 a control signal B* is generated. The generated control signal B* is a control signal adapted for one or more of the control systems 510, 520, 530, and/or 540. After the method step s630 a subsequent method step s635 is performed.

In the method step s635 the control system(s) of relevance is/are controlling one or more subsystems of the platform depending upon the generated control signal B*, wherein said generated control signal comprises the generated behaviour instructions. After the method step s635 the method ends.

Figure 7:
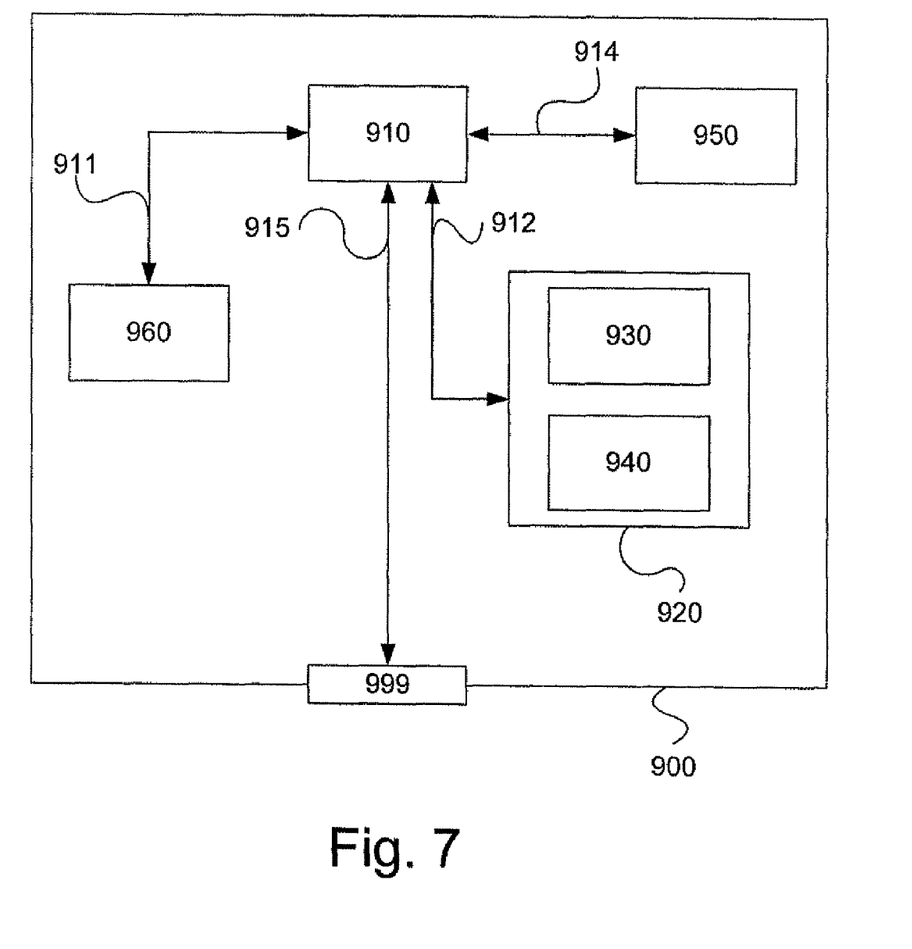
FIG. 7 schematically illustrates an apparatus according to an aspect of the present invention.

With reference to FIG. 7, a diagram of one embodiment of an apparatus 900 is shown. The above-mentioned autonomous system 400 and/or the decision making unit may include apparatus 900. Apparatus 900 comprises a non-volatile memory 920, a data processing device 910 and a read/write memory 950. Non-volatile memory 920 has a first memory portion 930 wherein a computer program, such as an operating system, is stored for controlling the function of apparatus 900. Further, apparatus 900 comprises a bus controller, a serial communication port, I/O-means, an A/D-converter, a time date entry and transmission unit, an event counter and an interrupt controller (not shown). Non-volatile memory 920 also has a second memory portion 940.

A computer program comprising routines for autonomous controlling of control systems of a platform is provided. The program may be stored in an executable manner or in a compressed state in a separate memory 960 and/or in read/write memory 950.

When it is stated that data processing device 910 performs a certain function it should be understood that data processing device 910 performs a certain part of the program which is stored in separate memory 960, or a certain part of the program which is stored in read/write memory 950.

Data processing device 910 may communicate with a data port 999 by means of a data bus 915. Non-volatile memory 920 is adapted for communication with data processing device 910 via a data bus 912. Separate memory 960 is adapted to communicate with data processing device 910 via a data bus 911. Read/write memory 950 is adapted to communicate with data processing device 910 via a data bus 914.

When data is received on data port 999 it is temporarily stored in second memory portion 940. When the received input data has been temporarily stored, data processing device 910 is set up to perform execution of code in a manner described above. According to one embodiment, data received on data port 999 comprises information such as input signals from sub-systems of the platform. This information can be used by apparatus 900 so as to perform controlling of the autonomous platform according to the invention.

Parts of the methods described herein can be performed by apparatus 900 by means of data processing device 910 running the program stored in separate memory 960 or read/write memory 950. When apparatus 900 runs the program, parts of the methods described herein are executed.

An aspect of the invention relates to a computer programme comprising a programme code for performing the method steps depicted with reference to FIGS. 6a and 6b, respectively, when the computer programme is run on a computer.

An aspect of the invention relates to a computer programme product comprising a program code stored on computer-readable media for performing the method steps depicted with reference to FIGS. 6a and 6b, respectively, when the computer programme is run on the computer.

An aspect of the invention relates to a computer programme product directly storable in an internal memory of a computer, comprising a computer programme for performing the method steps depicted with reference to FIGS. 6a and 6b, respectively, when the computer programme is run on the computer.

According to one embodiment of the invention there is provided a computer programme comprising a programme code for performing the method steps of
  generating at least one ability request associated with an ability;

performing a filtering process on said ability request;
generating at least one task depending upon the filtered ability request;
generating a set of behaviour instructions depending upon the generated task;
generating at least one control signal comprising information about the generated behaviour instructions; and
controlling at least one control system of the platform by means of said at least one control signal, when said computer programme is run on a computer, such as the apparatus 900 or within the autonomous system 400.

According to one embodiment of the invention there is provided a computer programme product comprising a program code stored on a computer readable media for performing the method steps generating at least one ability request associated with an ability;
performing a filtering process on said ability request;
generating at least one task depending upon the filtered ability request;
generating a set of behaviour instructions depending upon the generated task;
generating at least one control signal comprising information about the generated behaviour instructions; and
controlling at least one control system of the platform by means of said at least one control signal, when said computer programme is run on the computer, such as the apparatus 900 or within the autonomous system 400.

According to one embodiment of the invention there is provided a computer programme product directly storable in an internal memory of a computer, comprising a computer programme for performing the method steps:

generating at least one ability request associated with an ability;
performing a filtering process on said ability request;
generating at least one task depending upon the filtered ability request;
generating a set of behaviour instructions depending upon the generated task;
generating at least one control signal comprising information about the generated behaviour instructions; and
controlling at least one control system of the platform by means of said at least one control signal, when said computer programme is run on the computer, such as the apparatus 900 or within the autonomous system 400.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A decision making unit for controlling at least one control system of a set of control systems of a platform, said decision unit comprising:
   a receiving module configured to receive at least one ability request from requesting autonomous sub-systems arranged to detect a need for requesting an ability based on platform status information generated from a set of subsystems;
   a preconditioning module configured to precondition the at least one received ability request, wherein said preconditioning module is arranged to parameterize the at least one received ability request so as to adopt the at least one received ability request for further processing in the decision unit;
   a filter configured to filter the preconditioned at least one ability request, wherein said filter is arranged to apply at least one rule package on the at least one ability request so as to identify whether or not the at least one ability request is a valid request;
   a generator configured to generate a set of behaviour instructions associated with the filtered at least one ability request, wherein the generator is configured to generate the set of behaviour instructions is arranged to generate at least one task, wherein each task is related to a set of predetermined behaviour instructions, wherein the set of predetermined behaviour instructions comprises a combination of instructions relating to guidance, sensor use, payload and communication;
   a processor configured to priority process the filtered at least one ability request; and
   a generator configured to generate at least one control signal depending upon a prioritization process arranged to determine which of the filtered at least one ability request is to be communicated as control signals to different control systems of the set of control systems, wherein the control signal comprises information about the generated set of behaviour instructions related to the associated filtered at least one ability request so as to control the different control systems of the platform.

2. The decision making unit according to claim 1, wherein the filter configured to filter the preconditioned ability request comprises modular units, wherein each modular unit is configured to filter an associated ability request.

3. The decision making unit according to claim 1, wherein the preconditioning module configured to precondition the received ability request comprises a receiving module configured to receive platform status information, wherein the set of behaviour instructions is generated depending upon said platform status information.

4. The decision making unit according to claim 1, wherein a number of possible generated sets of behaviour instructions is finite.

5. The decision making unit according to claim 1, wherein a number of possible ability requests is finite.

6. The decision making unit according to claim 1, wherein the generator configured to generate the set of behaviour instructions is arranged to process a plurality of filtered ability requests simultaneously.

7. An autonomous system suitable for a platform, the autonomous system comprising:
   a decision making unit for controlling at least one control system of a set of control systems of the platform, the decision making unit comprising
      a receiving module configured to receive at least one ability request from requesting autonomous sub-systems arranged to detect a need for requesting an ability based on platform status information generated from a set of subsystems,
      a preconditioning module configured to precondition the received at least one ability request, wherein said preconditioning module is arranged to parameterize the at least one received ability request so as to adopt the at least one received ability request for further processing in the decision unit,
      a filter configured to filter the preconditioned at least one ability request, wherein said filter is arranged to apply at least one rule package on the at least one ability request so as to identify whether or not the at least one ability request is a valid request, a generator configured to generate a set of behaviour instructions associated with the filtered at least one ability request, wherein the generator is configured to generate the set of behaviour instructions is arranged to generate at least one task, wherein each task is related to a set of predetermined behaviour instructions, wherein the set of predetermined behaviour instructions comprises a combination of instructions relating to guidance, sensor use, payload and communication, a processor configured to priority process the filtered at least one ability request, and a generator configured to generate at least one control signal depending upon a prioritization process arranged to determine which of the filtered at least one ability request is to be communicated as control signals to different control systems of the set of control systems, wherein the control signal comprises information about the generated set of behaviour instructions related to the associated filtered at least one ability request so as to control the different control systems of the platform.

8. The autonomous system according to claim 7, further comprising:
a generator configured to generate ability requests a configured for communication with the decision making unit, and to automatically transmit generated ability requests to the decision making unit.

9. The autonomous system according to claim 7, further comprising:
a non-requesting module configured for communication with the decision making unit for providing information to the decision making unit, wherein said information comprises platform status information.

10. The autonomous system according to claim 7, further comprising:
a generator configured to generate ability requests and comprising interchangeably arranged modular units.

11. An autonomous platform, comprising:
an autonomous system comprising
a decision making unit for controlling at least one control system of a set of control systems of the platform, the decision making unit comprising
a receiving module configured to receive at least one ability request from requesting autonomous sub-systems arranged to detect a need for requesting an ability based on platform status information generated from a set of subsystems,
a preconditioning module configured to precondition the received at least one ability request, wherein said preconditioning module is arranged to parameterize the at least one received ability request so as to adopt the at least one received ability request for further processing in the decision unit,
a filter configured to filter the preconditioned at least one ability request, wherein said filter is arranged to apply at least one rule package on the at least one ability request so as to identify whether or not the at least one ability request is a valid request,
a generator configured to generate a set of behaviour instructions associated with the filtered at least one ability request, wherein the generator is configured to generate the set of behaviour instructions is arranged to generate at least one task, wherein each task is related to a set of predetermined behaviour instructions, wherein the set of predetermined behaviour instructions comprises a combination of instructions relating to guidance, sensor use, payload and communication,
a processor configured to priority process the filtered at least one ability request, and
a generator configured to generate at least one control signal depending upon a prioritization process arranged to determine which of the filtered at least one ability request is to be communicated as control signals to different control systems of the set of control systems, wherein the control signal comprises information about the generated set of behaviour instructions related to the associated filtered at least one ability request so as to control the different control systems of the platform; and
autonomous sub-systems arranged to detect a need for requesting an ability.

12. The autonomous platform according to claim 11, wherein a set of sub-systems is arranged to generate platform status information and communicate said information to the autonomous system.

13. The autonomous platform according to claim 11, wherein the platform is a flying vehicle.

14. The autonomous platform according to claim 11, wherein the platform is a watercraft or an under watercraft, or a land vehicle.

15. A method for controlling a platform autonomously, the method comprising:
detecting a need for requesting at least one ability based on platform status information generated from a set of subsystems;
generating at least one ability request associated with said ability;
preconditioning the received at least one ability request by providing the ability request with predetermined internal variables;
performing a filtering process on said at least one ability request by applying at least one rule package on the at least one ability request so as to identify whether or not the at least one ability request is a valid request;
generating at least one task depending upon the filtered at least one ability request;
generating a set of behaviour instructions depending upon the generated task, wherein the set of predetermined behaviour instructions comprises a combination of instructions relating to guidance, sensor use, payload and communication;
generating at least one control signal comprising information about the generated behaviour instructions related to the associated filtered at least one ability request so as to control the different control systems of the platform, wherein the at least one control signal depends upon a prioritization process arranged to determine which of the filtered at least one ability request is to be communicated as control signals to different control systems of the set of control systems; and
controlling at least one control system of the platform with said control signal.

16. The method according to claim 15, wherein the generating at least one task depends upon a status information data entity comprising information about platform status.

17. The method according to claim 15, wherein the generating at least one ability request depends upon sub-system generated input data.

18. The method according to claim 15, further comprising:
prioritizing one control out of a plurality of generated control signals.

19. A computer program product, comprising:
a non-transitory computer readable medium; and
computer program instructions recorded on the computer readable medium and executable by a processor for performing a method comprising detecting a need for requesting at least one ability based on a platform status information generated from a set of subsystems;

generating at least one ability request associated with said ability;

preconditioning the received at least one ability request by providing the ability request with predetermined internal variables;

performing a filtering process on said at least one ability request by applying at least one rule package on the at least one ability request so as to identify whether or not the at least one ability request is a valid request;

generating at least one task depending upon the filtered at least one ability request;

generating a set of behaviour instructions depending upon the generated task, wherein the set of predetermined behaviour instructions comprises a combination of instructions relating to guidance, sensor use, payload and communication;

generating at least one control signal comprising information about the generated behaviour instructions related to the associated filtered at least one ability request so as to control the different control systems of the platform, wherein the at least one control signal depends upon a prioritization process arranged to determine which of the filtered at least one ability request is to be communicated as control signals to different control systems of the set of control systems; and controlling at least one control system of the platform with said control signal.

20. The autonomous system according to claim 7, wherein the platform comprises an airborne vehicle.

21. The autonomous platform according to claim 13, wherein the flying vehicle is selected from the group consisting of: an aircraft, an airplane, and a helicopter.

22. The autonomous platform according to claim 14, wherein the watercraft or an under watercraft is selected from the group consisting of: a boat, a ship, and a submarine, and the land vehicle is selected from the group consisting of: an automobile, a train, and a cross-country vehicle.

* * * * *